Dec. 17, 1946.　　　　B. ENDER　　　　2,412,570
MATERIAL HANDLING DEVICE
Filed July 5, 1944　　　　2 Sheets-Sheet 2
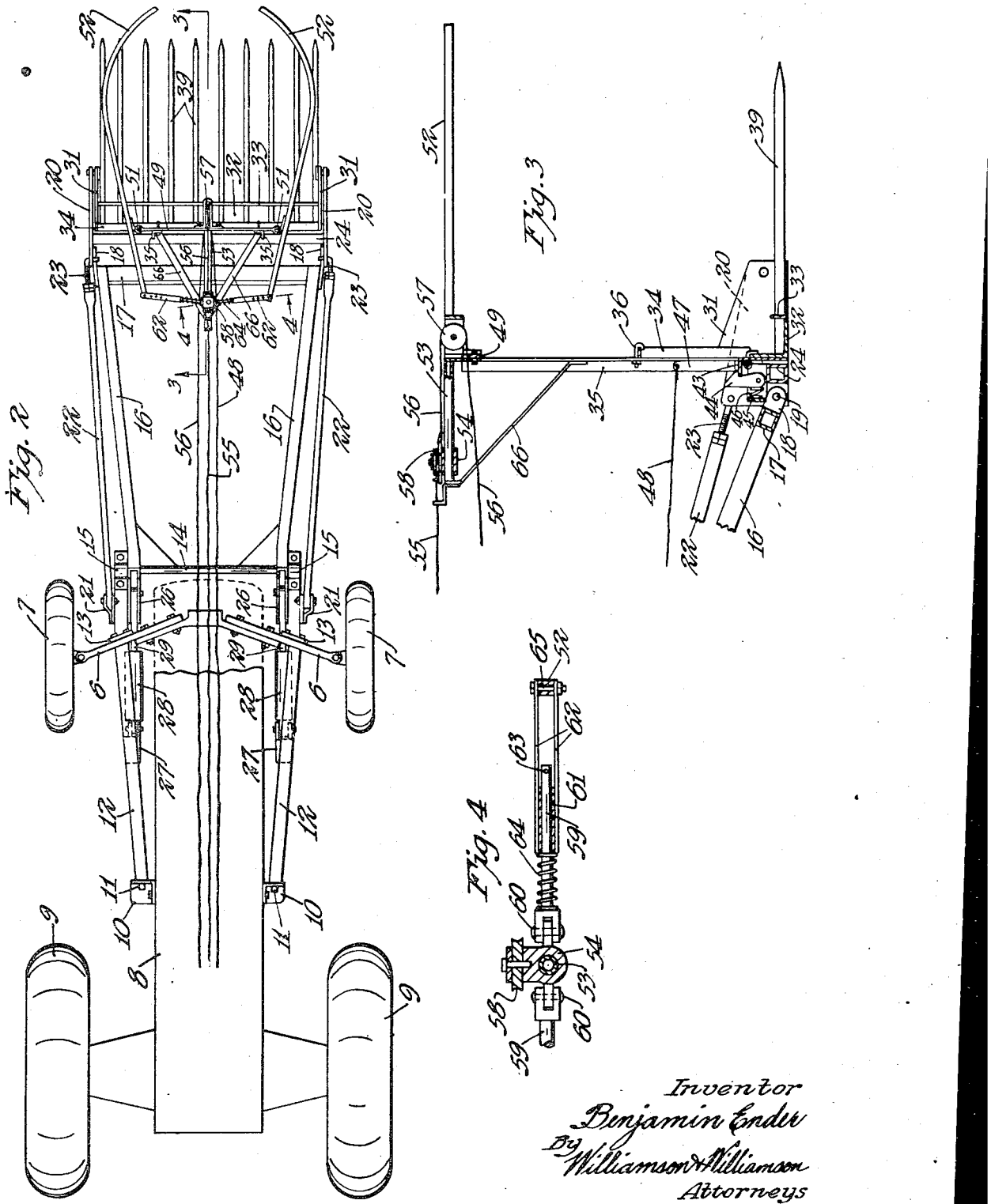
Inventor
Benjamin Ender
By Williamson & Williamson
Attorneys Patented Dec. 17, 1946

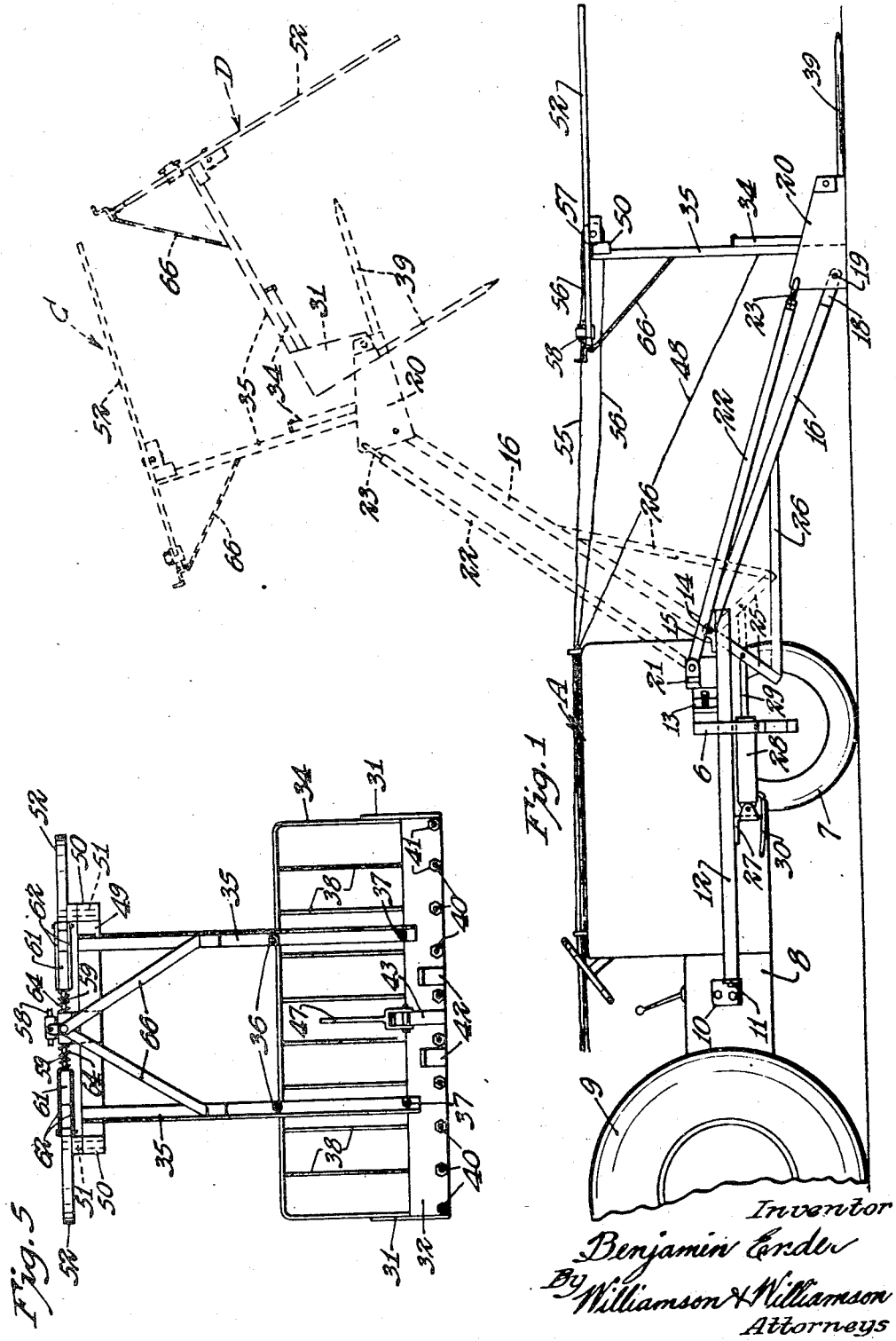

2,412,570

UNITED STATES PATENT OFFICE 2,412,570

MATERIAL HANDLING DEVICE

Benjamin Ender, Hokah, Minn., assignor to
Phyllis S. Ender, Hokah, Minn.

Application July 5, 1944, Serial No. 543,534

6 Claims. (Cl. 214—140)

This invention relates to material handling apparatus which is particularly adapted for use in lifting and loading materials such as corn shocks.

One of the objects of the invention is to provide apparatus which can be attached to an ordinary farm tractor or the like wherein the apparatus is secured to the lower portion of the tractor and does not include framework extending above the tractor to obstruct the view of the operator, and whereby the center of gravity of the device is kept as low as possible.

Another object of the invention is to provide apparatus of the class described which is made up of a few simply constructed parts adapted to be operated by a power device having a relatively short operating movement which is transmitted to the elevating mechanism to give the latter a relatively large degree of movement.

A further object of the invention is to provide apparatus of the above described type wherein means is provided for simply and positively controlling the angle of the material supporting means as the apparatus is elevated.

Still a further object of the invention is to provide apparatus which can be positioned beneath a load to be handled in combination with means for releasably gripping the load above the bottom supporting means so that the load can be effectively elevated, carried and released.

A more specific object of the invention is to provide apparatus for handling a shock of corn to be loaded on a wagon in a field, wherein a part of the device passes beneath the shock of corn and another part of the device located thereabove grips the sides of the shock so that the corn stalks are held together and the shock is held in an upright position and wherein the shock can be thus lifted from the ground and the supporting and gripping mechanism can then be tilted or released to permit loading of the shock upon the wagon.

These and other objects and advantages of the invention will more fully appear from the following description made in connection with the accompanying drawings, wherein like reference characters refer to the same parts throughout the views, and in which:

Figure 1 is a side elevation of the device mounted upon a tractor and showing different positions thereof in dotted lines;

Figure 2 is a plan view of the apparatus;

Figure 3 is an enlarged vertical section taken approximately on the line 3—3 of Figure 2;

Figure 4 is an enlarged section taken approximately on the line 4—4 of Figure 2; and Figure 5 is a rear elevation of the load carrying and gripping member.

In Figures 1 and 2 there is shown a tractor A having a front axle unit 6 carrying front wheels 7. There is also illustrated a transmission housing 8. The rear of the tractor is, of course, supported by wheels 9.

Secured at opposite sides of the transmission housing 8 are brackets 10 adapted to removably receive the reduced ends 11 of a pair of frame members 12. The frame members 12 extend forwardly beneath the tractor axle 6 and are secured thereto by brackets 13 which extend upwardly from said frame members 12. As shown in the drawings, said frame members terminate forwardly of the axles 6 and are connected at their forward ends by a bar 14 whose ends rest in bearings 15 to permit said bar to rotate relative to the frame members 12.

Mounted on the front bar 14 is a pair of implement booms 16 whose rear ends lie adjacent the ends of said bar 14 and just inside of the forward ends of the frame members 12. The implement booms 16, as shown in Figure 2, diverge somewhat in a forward direction and their forward ends are connected by a cross member 17. The forward end of each boom 16 has a strap 18 secured thereto which is connected by a pivot 19 to a plate 20 at the lower rear corner of the plate.

Extending upwardly from the forward portion of each of the frame members 12 and just behind the bearings 15 which carry the rod 14 are brackets 21. Pivotally connected to each bracket 21 is a stabilizer arm 22 which extends forwardly and is pivotally connected by means of an angled connector 23 to the upper rear corner of the plate 20 to which each implement boom 16 is secured. In order to provide rigidity at the forward ends of the booms 16 and stabilizer arms 22 a cross member 24 is provided to connect the plates 20.

Each of the booms 16 has a short arm 25 extending downwardly and rearwardly therefrom at the pivot point provided by the cross bar 14, as shown in Figure 1. The arm 25 is provided with a brace 26 connecting its lower end with an intermediate portion of the boom 16. Mounted intermediate the ends of the frame members 12 are brackets 27 which have hydraulic rams 28 secured thereto, said rams having piston rods 29 which extend forwardly and pivotally connect with the downwardly extending arms 25. A flexible conduit 30 is connected to each of the hydraulic rams 28 and is adapted to lead to a suitable hydraulic pumping system on the tractor A. Such a system is incorporated in tractors manufactured by the Ford Motor Company for the vertical swinging of the tractor drawbar. This hydraulic pumping system is generally known and need not be described in detail.

Pivotally mounted to the forward portions of the plate 20 on the forward ends of the implement booms 16 are plates 31. Extending between the plates 31 and welded thereto is an angle iron 32 and also a cross bar 33 which lies just in front of the angle iron 32. Also secured between the plates 31 is an inverted U-shaped metal strap 34 which extends above the plates 31. Extending upwardly from the angle iron 32 and above the inverted U-shaped member 34 are vertical angle irons 35. The members 35 are provided with threaded hook members 36 which connect them to the upper horizontal portion of the inverted U-shaped member 34 and similar threaded hook members 37 connect the lower ends of the vertical angle irons 35 to the upper edge of the transverse angle iron 32. Extending between the horizontal upper portion of the inverted U-shaped members 34 and the transverse angle iron 32 are spaced rods 38. Rake tines 39 have reduced rear end portions 40 shown in Figure 5 which extend through the vertical portion of the transverse angle iron 32 and are threaded to receive nuts 41 which secure the tines to said angle iron 32. The tines also extend through the transverse strap 33 in front of the angle iron 32 to give additional support to them.

On the rear of the transverse angle iron 32 is a pair of angular stop members 42. The rearwardly extending horizontal portions thereof are adapted to rest upon the cross member 24 which is connected between the spaced plate members 20 on the forward ends of the implement booms 16. The members 42 prevent the rake from tilting beyond the full line position of Figure 1 and the position shown in Figure 3.

Between the angle stops 42 is an angularly formed latch member 43 which is adapted to cooperate with a pivoted catch 44 mounted on the tubular cross member 24. The catch 44 includes a bracket 45 which houses a spring 46 normally urging the latch 44 forwardly so that it will properly engage the angled strap 43. Pivotally supported by the angled strap 43 is a forked arm 47 whose upper end has a cable 48 secured thereto, the latter extending rearwardly to a point adjacent the location of the operator of the tractor. The arm 47 can be swung rearwardly to displace the pivoted catch member 44 from its position over the member 43 thus releasing the rake unit for tilting and dumping movement.

The upright angle members 35 are connected by a cross member 49 in whose ends are formed bearings 50 to receive pivot pins 51 which pivotally support grab arms 52. As best shown in Figure 2, the grab arms 52 extend forwardly and have their outer ends curved inwardly toward each other. The rear ends of the arms 52 extend rearwardly of the pivots 51 and are connected by the assembly shown in Figures 2, 4 and 5. Extending rearwardly from the cross member 49 is a rod 53 upon which is slidably mounted a casting 54. A cable 55 attached to the rear end of the casting 54 enables said casting to be pulled rearwardly on the rod 53 and a cable 56 extends forwardly from the casting 54, over a pulley 57 and thence rearwardly so that when the cable 53 is pulled it will move the casting 54 forwardly on the rod 53. The cable 55 extends about a pulley 58 on the casting 54. The pulleys 57 and 58 and their association with the cables 55 and 56 provide additional leverage and permit the operator to move the casting forwardly and rearwardly without expenditure of too great effort.

It should be noted in Figure 2 that when the casting 54 is moved rearwardly to similarly move the inner ends of the rods 59, said casting and the ends of said rods are in a rearward over center position to releasably secure the shock grasping arms 52 in their closed shock engaging position.

The casting 54 has a pair of rods 59 secured thereto on pivots 60 and the outer ends of the rods 59 are slidable in sleeves 61 which are secured between pairs of straps 62. Each rod 59 has a pin 63 through its end to limit movement of the rod inwardly relative to its sleeve 61. A compression spring 64 is located on each rod 59 between its inner end and the inner ends of the straps 62 and the sleeves 61 to normally urge the rods 59 outwardly relative to the sleeves 61 and straps 62. The straps 62 at their outer ends are connected by pivot pins 65 to the rear ends of the shock grasping arms 52.

The rear end of the rod 53 which carries the casting 54 is suitably supported by a pair of upwardly and rearwardly converging braces 66.

When a quantity of material such as a shock of corn is to be lifted and transported or loaded on a wagon the apparatus is first moved to the full line position of Figure 1 by manipulation of the above mentioned tractor hydraulic mechanism. The tractor is then moved forwardly with the shock grasping arms 52 opened. In the open position of the arms 52 the casting 54 is pulled forwardly on the rod 53 by a pull on the cable 56. The rake tines 39 will slide under the shock by forward movement of the tractor and the cable 55 is then pulled to close the shock grasping arms 52 which are adapted to tightly grip the shock at a point considerably above the bottom thereof. To allow for difference in sizes of corn shocks or other loads of material to be handled the springs 64 are provided to permit relative movement of the arms 52 and the rods 59 which connect with their rear ends. The hydraulic ram 28 is then actuated to push the piston rod 29 forwardly and raise the implement booms 16 and stabilizer arms 22 to an elevated position such as the dotted line position shown in Figure 1. At such time the load is held in the position C of Figure 1. When it is desired to dump the load from the apparatus the cable 48 is pulled to release the spring catch 44 and the weight of the load on the rake tines 29 will cause the rake unit to tilt forwardly to the dotted line position D of Figure 1. The load grasping arms 52 can be opened just prior to tilting of the rake unit so that the load will dump freely.

The relationship between the pivots of the rake booms 16 and stabilizer arms 22 is such that the rake tines will tilt rearwardly to some extent as illustrated in Figure 1 as the device is elevated, thus keeping the load from falling from the apparatus. The angle of the rake unit can be varied by adjustment of the angled hook members 23 inwardly or outwardly relative to the stabilizer arms 22.

The device can be used as stated above for lifting and loading shocks of corn or the rake tine unit alone can be used for loading or transporting any other suitable materials.

As best shown in Figure 1 the apparatus when lowered is entirely out of the line of vision of the tractor operator and it can be moved across the ground in a slightly elevated position without interfering with vision. Not only does the low connection of the device with the tractor provide better vision for the operator and lower the center of gravity of the entire device but it does not hamper servicing or other work on the tractor engine or other essential parts thereof. The apparatus can be readily removed and attached and the structure is such that it can be easily done by one person.

It will, of course, be understood that various changes may be made in the form, details, arrangement and proportions of the various parts without departing from the scope of my invention.

What I claim is:

1. A corn shock handling device comprising, a support, means for raising and lowering said support, and a pair of substantially non-resilient shock gripping elements connected to said support a considerable distance above said support to permit gripping of a generally vertically central portion of a shock, said shock gripping elements, in the lowered position of said support, being spaced above ground level and swingable toward and away from each other in a substantially horizontal plane a considerable distance as compared to the area of said support.

2. A corn shock handling device comprising, a support, means for raising and lowering said support, and a pair of shock gripping elements connected to said support a considerable distance above said support to permit gripping of a generally vertically central portion of a shock, said shock gripping elements being spaced laterally and having their outer ends directed generally toward each other and also being swingable toward and away from each other.

3. A corn shock handling device comprising, a support, means for raising and lowering said support, and a pair of shock gripping elements connected to said support for pivotal movement toward and away from each other and located a considerable distance above said support, said shock gripping elements in their limit of movement toward each other substantially enclosing an area approximately the same as and located above said support.

4. A material handling device for tractors comprising, a pair of spaced boom elements having inner and outer ends, the inner ends of said boom elements having means for pivotally securing them to the lower forward portion of a tractor for vertical swinging movement, arms extending downwardly and rearwardly from the pivoted inner ends of said boom elements and lying in approximately the same vertical planes with their respective boom elements, fluid piston and cylinder units adapted for mounting in a horizontal position along the lower side portions of the tractor, each of said piston and cylinder units having a tractor connection and a connection with its respective downwardly and rearwardly extending arm, and means on the outer ends of said boom elements for securing the latter to an implement to be carried thereby.

5. A material handling device for tractors comprising, a boom unit having inner and outer ends, the inner end of said boom unit having a horizontally axial pivot for connecting said boom unit to the lower portion of a tractor chassis for vertical swinging movement, said boom unit also having a pivot located below and rearwardly of said first mentioned pivot when said boom is in a lowered position, a power device adapted for mounting on the tractor and having a portion connected to said second mentioned pivot, and said portion of said power device being shiftable forwardly to raise said boom unit about said first mentioned pivot.

6. A material handling device for tractors comprising, a pair of spaced boom elements having inner and outer ends, the inner ends of said boom elements having means for pivotally securing them to the lower forward portion of a tractor for vertical swinging movement, said boom elements having portions extending downwardly and rearwardly from said pivotal securing means and lying in approximately the same vertical planes as the remainder of said boom elements, fluid piston and cylinder units adapted for mounting in a horizontal position along the lower side portions of the tractor, each of said piston and cylinder units having a tractor connection and a connection with its respective downwardly and rearwardly extending boom portions, and means on the outer ends of said boom elements for connecting the latter with an implement to be carried thereby.

BENJAMIN ENDER.